United States Patent [19]
Cook, Jr. et al.

[11] 3,852,135
[45] Dec. 3, 1974

[54] PATCHING DAMAGED CATION-ACTIVE PERMSELECTIVE DIAPHRAGMS

[75] Inventors: Edward H. Cook, Jr., Lewiston; Alvin T. Emery, Youngstown, both of N.Y.; Blaine O. Schoepfle, New Canaan, Conn.

[73] Assignee: Hooker Chemical Corporation, Niagara Falls, N.Y.

[22] Filed: Aug. 9, 1973

[21] Appl. No.: 387,072

Related U.S. Application Data

[63] Continuation-in-part of Ser. No. 212,171, Dec. 27, 1971.

[52] U.S. Cl.................. 156/94, 117/2 R, 204/296, 210/232, 210/500, 260/32 R, 260/33.4 F
[51] Int. Cl............................................. B32b 35/00
[58] Field of Search........... 210/232, 500; 260/32 R, 260/33.4 F, 29.6 PS, 29.6 F; 204/296; 156/94, 98, 97; 117/2 R

[56] References Cited
UNITED STATES PATENTS

| | | | |
|---|---|---|---|
| 3,713,926 | 1/1973 | Speer | 156/98 |
| 3,804,685 | 4/1974 | Jacoby et al. | 156/98 |

*Primary Examiner*—Edward G. Whitby
*Attorney, Agent, or Firm*—Peter F. Casella; Richard P. Mueller

[57] ABSTRACT

A method is disclosed for patching cation-active permselective diaphragm material consisting essentially of a hydrolyzed copolymer of a perfluorinated hydrocarbon and a fluorosulfonated perfluorovinyl ether.

13 Claims, No Drawings

PATCHING DAMAGED CATION-ACTIVE PERMSELECTIVE DIAPHRAGMS

CROSS REFERENCE TO RELATED APPLICATION

This application is a continuation-in-part application of U.S. application Ser. No. 212,171 filed Dec. 27, 1971.

This invention relates to a method for the repairing of cation-active permselective diaphragms.

BACKGROUND OF THE INVENTION

The electrolysis of aqueous solutions of ionizable chemical compounds, particularly brine solutions, in a cell equipped with an anode and a cathode separated by a porous diaphragm is well known in this art. In most instances such cells are operated under conditions such that ionic migration and molecular migration through the porous diaphragm occurs to a substantial degree rsulting in the contamination of the cathode liquor with undecomposed electrolyte and of the anode liquor with reaction products of the cathodic material and anodic materials.

It has been proposed to replace the porous diaphragm in such cells with a diaphragm impervious to both liquids and gases thereby to control both ionic and molecular migration during electrolysis. Many patents, such as U.S. Pat. No. 2,967,807, U.S. Pat. No. 3,390,055, and French Pat. No. 1,510,265, disclose electrolytic cells incorporating as the diaphragm, membranes fabricated from synthetic organic ion-exchange resins. Among such resins, cation exchange resins of the "Amberlite" type, sulfonated co-polymers of styrene and divinyl benzene and others have been disclosed.

However, such resins have not been entirely satisfactory for one or more of the following reasons:

a. The resins are not stable to strong caustic and/or concentrated acidic solutions at temperatures above about 75° centigrade.

b. The resins are effective only for relatively short periods.

c. The resins are expensive and fabrication costs are relatively high.

d. The voltage drop through the membrane becomes inordinately high as the caustic concentration in the cathode compartment increases to above about 200 gpl caustic.

e. Ion selectively and chemical compatibility of the membrane decreases as the caustic concentration of the catholyte liquor increases.

f. Caustic efficiency of the electrolysis decreases as the caustic concentration in the cathode compartment increases.

It can be seen that prior art procedures for electrolyzing aqueous solutions containing electrolytes wherein diaphragms comprising an ion-exchange substance leave something to be desired.

In copending application, Ser. No. 212,171 filed Dec. 27, 1971, of which this application is a continuation-in-part, there is disclosed a method and apparatus for the electrolysis of ionizable chemical compounds wherein there is employed an electrolytic cell comprising as the diaphragm material a membrane consisting essentially of a hydrolyzed copolymer of tetrafluoroethylene and a sulfonated perfluorovinyl ether of the formula $$FSO_2CF_2CF_2OCF(CF_3)CF_2OCF=CF_2$$

said copolymer having an equivalent weight of from about 900 to about 1,600.

It has been found that such membrane material is subject to pinholing and tearing during handling or after installation in the electrolysis cell or during use during the operation of the cell. Inasmuch as the diaphgrgm material depends in part upon its imperviousness to liquids and gases, it can be seen that a method for repairing holes and tears in such diaphragm material would be highly desirable.

OBJECTS OF THE INVENTION

It is thus a primary object of this invention to provide a method for repairing damaged sections of cationic-active permselective diaphragm material of the type referred to above.

Other objects and advantages of the present invention will be apparent to those skilled in this art on consideration of this specification and the claims appended hereto.

SUMMARY OF THE INVENTION

The objects and advantages of this invention are accomplished by forming a solution of a hydrolyzed copolymer of a perfluorinated hydrocarbon and a fluorosulfonated perfluorovinyl ether but having an equivalent weight somewhat below that of the damaged hydrolyzed copolymer of the same chemical type in a lower hydrocarbon alkanol applying said solution to the area adjacent to the damaged section of hydrolyzed copolymer diaphragm, covering the damaged section with a patch of hydrolyzed copolymer of the same equivalent weight as the diaphragm material and removing the lower hydrocarbon alkanol solvent from the covered area.

The patch is thereby firmly bonded to the diaphragm material and by covering the damaged section enables the diaphragm to once again function as a barrier to liquids and gases in the manner of the undamaged sections of the diaphragm.

DETAILED DESCRIPTION OF THE INVENTION

In accordance with a preferred mode of carrying out the invention, damaged sections, e.g., pin holes tears and the like, of of a hydrolyzed copolymer of a perfluorinated hydrocarbon and a fluorosulfonated perfluorovinyl ether, preferably a hydroluzed copolymer of tetrafluoroethylene and a sulfonated perfluorovinyl ether of the formula $$FSO_2CF_2CF_2OCF(CF_3)CF_2OCF=CF_2$$

said copolymer having an equivalent weight of from about 1,000 to about 1,600, are repaired by a. forming a solution of a second hydrolyzed copolymer of tetrafluoroethylene and a sulfonated perfluorovinyl ether having an equivalent weight of from about 900 to 1,000, in a lower hydrocarbon alkanol, e.g., methanol, ethanol, isopropanol, n-butanol, and the like, b. contacting the area adjacent to the damaged area of the damaged copolymer with said solution thereby wetting the damaged area with said solution, c. covering the damaged area with a patch of hydrolyzed copolymer of equivalent weight of about 1,000 to about 1,600, and d. removing the lower alkanol solvent from the covered area, as by drying with a current of warm air.

Copolymers of the preferred character referred to above are prepared as disclosed in U.S. Pat. No. 3,282,875, by reacting, at a temperature below about 110° centigrade a sulfonated perfluorovinyl ether of the formula

with tetrafluoroethylene in an aqueous liquid phase, preferably at a pH below 8, and in the presence of a free radical initiator, such as ammonium persulfate. The resulting copolymer having an equivalent weight of about 900 to about 1,600, can be hydrolyzed to the free acid by boiling in water, dilute aqueous acid or converted to salt form by treatment with dilute aqueous base.

As above indicated the preferred cation-active permselective membranes which can be repaired by the process of this invention are formed from hydrolyzed copolymers of tetrafluoroethylene and perfluro-2-(2-fluorosulfonylethoxy)-propyl vinyl ether. Other perfluorinated hydrocarbons, both saturated and unsaturated, having from two to five carbon atoms may also be utilized of which the monoolefinic hydrocarbons are preferred, especially those containing from two to four carbon atoms, most especially those containing from two to three carbon atoms, e.g., tetrafluoroethylene, hexafluoropropylene and the like as well as mixtures thereof.

The fluorosulfonated perfluorovinyl ether which is most useful is that of the

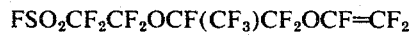

which is named chemically as perfluoro-2-(2-fluorosulfonylethoxy)-propyl vinyl ether. This component may be modified to equivalent monomers, as by modifying the internal perfluorosulfonylethoxy-moiety to the corresponding propoxy, or butoxy, moiety and by altering the propyl moiety to ethyl or butyl moieties, plus rearranging the positions of substitution of the fluorosulfonyl moiety thereon and utilizing various isomers of the perfluro-lower alkyl groups, respectively.

These copolymers can also be manufactured by the process of the above referred to U.S. Pat. No. 3,282,785. Further an alternative method is disclosed in Canadian Pat. No. 849,670, which also discloses the use of the copolymers in the preparation of finished membranes in fuel cells, characterized therein as electrochemical cells. The disclosures of such patents are hereby incorporated herein by reference.

The diaphragms useful in the practice of this invention may have been prepared and utilized in the form of thin films, either as such or deposited on an inert support material, such as a cloth woven of Teflon, glass fibers or the like material. The thickness of the supported membrane can be varied over a considerable range, as for example, from about 5 to 15 mils in thickness.

The copolymeric membrane material after conversion to the free acid or salt state is subject to pin-holing and tearing in use in the electrolytic cell or on handling. It has been found that the hydrolyzed copolymer of relatively low equivalent weight, that is for example, of about 900 to 1,000 is surprisingly soluble in certain organic solvents particularly the lower hydrocarbon alcohols, that is hydrocarbon alkanols having from one to four carbon atoms.

Typical of such alkanols are the following:
methanol
ethanol
n-propanol
isopropanol
n-butanol
2-butanol Mixtures of these and equivalent lower hydrocarbon alcohols are contemplated also.

Such solutions of the lower equivalent weight hydrolyzed copolymer material and lower hydrocarbon alcohol, which may contain up to about 25 percent by weight of the solute, have been found to be excellent adhesives for the higher equivalent weight hydrolyzed copolymers, and consequently can be used to assist in the patching or repairing of damaged, i.e., pin-holed or torn, membranes. Preferably solutions containing from about 10 to about 20 percent by weight of solute are conviently prepared and used.

In a most preferred manner of carrying out the process of the present invention a solution of hydrolyzed polymer of tetrafluoroethylene and perfluoro(2-fluorosulfonylethoxy)-propyl vinyl ether having an equivalent weight of from about 900 to about 1,000 in ethanol, and containing from about 10 to about 20 percent by weight of the said solute is prepared by warming a slurry of the hydrolyzed copolymer in the solvent. The resulting solution is applied, i.e., by brushing or spraying or the like, the area around the damaged portion of the membrane thereby to thoroughly wet the surface thereof. A patch of higher equivalent weight copolymer of sufficient size to cover the damaged area, the surface of which patch is also wetted with the adhesive solution, is pressed against the wetted damaged area. The patched membrane section is dryed or otherwise treated to remove the alcoholic solvent. The resultant patch adhers to the covered surface of the membrane forming a contiguous adherent area which is substantially impervious to liquids and gases to substantially the same degree as the original material.

The following examples illustrate certain preferred embodiments of the present invention. Parts and percentages are by weight and temperatures are given in degrees centigrade, unless otherwise specified.

EXAMPLE 1

Fifteen parts of the hydrolyzed copolymer of tetrafluoroethylene and perfluoro (2-fluorosulfonylethoxy)-propyl vinyl ether, having an equivalent weight of about 1,000, which had been cut into small pieces were suspended in 100 parts of ethanol and the suspension was agitated and warmed to about 55° and 60° until solution occurred, about 1 hour. The resulting solution was filtered, warm, to remove a small amount of insoluble material and the clear solution was cooled to ambient temperature.

A section of a 10 mil thick film of a hydrolyzed copolymer of tetrafluoroethylene and perfluoro(2-fluorosulfonylethoxy) propylene vinyl ether having an equivalent weight of about 1,100 on a woven Teflon support which had been used as a cation-active permselective membrane to separate the anode and cathode of a brine electrolysis cell as described in Example 1 of Ser. No. 212,171, was damaged by cutting the membrane with a knife to form a tear measuring about 1 inch long in the film. An area of about 2 inches square around the tear in the membrane was thoroughly wetted with the copolymer solution prepared above by brushing. A patch of about 2 inches square of the higher equivalent weight copolymer was likewise wetted with the adhesive solution and then applied to the wetted area around the tear in the membrane. The patch was pressed upon the membane and held firmly in place for about 30 minutes to permit the solvent to evaporate. The patch was firmly adhered to the membrane which could then be replaced in service in the cell to provide a diaphragm which was impervious to liquids and gases.

EXAMPLE 2

Ten parts of a hydrolyzed co-polymer of tetrafluoroethylene and perfluoro-(2-fluorosulfonylethoxy)-propylene vinyl ether having an equivalent weight of about 900 were suspended in about 100 parts of isopropanol. The suspension was agitated and heated at about 55° to 60° until solution of the copolymer was essentially complete, about one hour. The solution was filtered to remove a small amount of insoluble material and the clarified filtrate was cooled to ambient temperature.

A section of the hydrolyzed copolymer of the character as described in Example 1 above which had been used as the diaphragm in a two compartment brine electrolysis cell was pierced with the point of an ice pick to produce a simulated pin hole. Three such pin holes were made in an area of about 2 square inches of the diaphragm film. The damaged area was brushed with the copolymer solution prepared above, covering an area of about 4 square inches encompassing the pin holes. This wetted area was covered with a patch of about four square inches of the same hydrolyzed copolymer material as the damaged film material, and which had been brushed with the copolymer solution on one side. The patch was pressed wetted side down onto the damaged surface and firmly held thereon while a current of warm air was blown onto the patch to assist in evaporating the solvent from the patched area. When dry, about 30 minutes, the patch was securely bonded to the film and the diaphragm could be replaced in service and was impervious to liquids and gases to the same degree as the original undamaged membrane material.

The invention has been described and illustrated with reference to certain preferred embodiments and details. It will be obvious that modifications and changes can be made in these above described details without departing from the scope or spirit of the invention and accordingly it is to be understood that the invention is not to be limited to said embodiments and details.

What is claimed is:

1. A process for repairing damaged sections of a hydrolyzed copolymer of a perfluorinated hydrocarbon containing from two to five carbon atoms and a fluorosulfonated perfluorovinylether which comprises
   a. forming a solution of a second hydrolyzed copolymer of a perfluorinated hydrocarbon containing from 2 to 5 carbon atoms and a fluorosulfonated perfluorovinyl ether, said second copolymer having a lower equivalent weight than said damaged copolymer in a lower hydrocarbon alkanol,
   b. wetting the area adjacent to the damaged area of the damaged copolymer,
   c. covering the wetted area with a patch of hydrolyzed copolymer of the same equivalent weight as that of said damage copolymer and
   d. removing the lower alkanol solvent from the covered area.

2. The process of claim 1 wherein said perfluorinated hydrocarbon contains from two to four carbon atoms.

3. The process of claim 2 wherein said perfluorinated hydrocarbon contains from two to three carbon atoms.

4. The process of claim 1 wherein said hydrolyzed copolymer of said damaged section is a copolymer of tetrafluoroethylene and a fluorosulfonated perfluorovinyl ether of the formula $$FSO_2CF_2CF_2OCF(CF_3)CF_2OCF=CF_2$$

said copolymer having an equivalent weight of from about 1,000 to about 1,600 and said second hydrolyzed copolymer is a copolymer of the same reactants but has an equivalent weight of from about 900 to about 1,000.

5. The process of claim 4 wherein the damaged copolymer has an equivalent weight of about 1,100 to about 1,400.

6. The process of claim 1 wherein said alkanol contains from one to four carbon atoms.

7. The process of claim 6 wherein said alkanol is ethanol.

8. The process of claim 6 wherein said alkanol is isopropanol.

9. The process of claim 6 wherein said alkanol solution contains from about 10 to about 20 percent by weight of said second hydrolyzed copolymer.

10. The process of claim 9 wherein said alkanol solution contains about fifteen percent by weight of said copolymer.

11. The process of claim 9 wherein said alkanol solution contains about ten percent by weight of said copolymer.

12. The process of claim 1 wherein said patch is also wetted with the solution of said second copolymer prior to covering the damaged area therewith.

13. The process of claim 12 wherein the side of the patch which is to be placed in contact with the damaged area of copolymer is wetted with the solution of the copolymer.

* * * * *